UNITED STATES PATENT OFFICE.

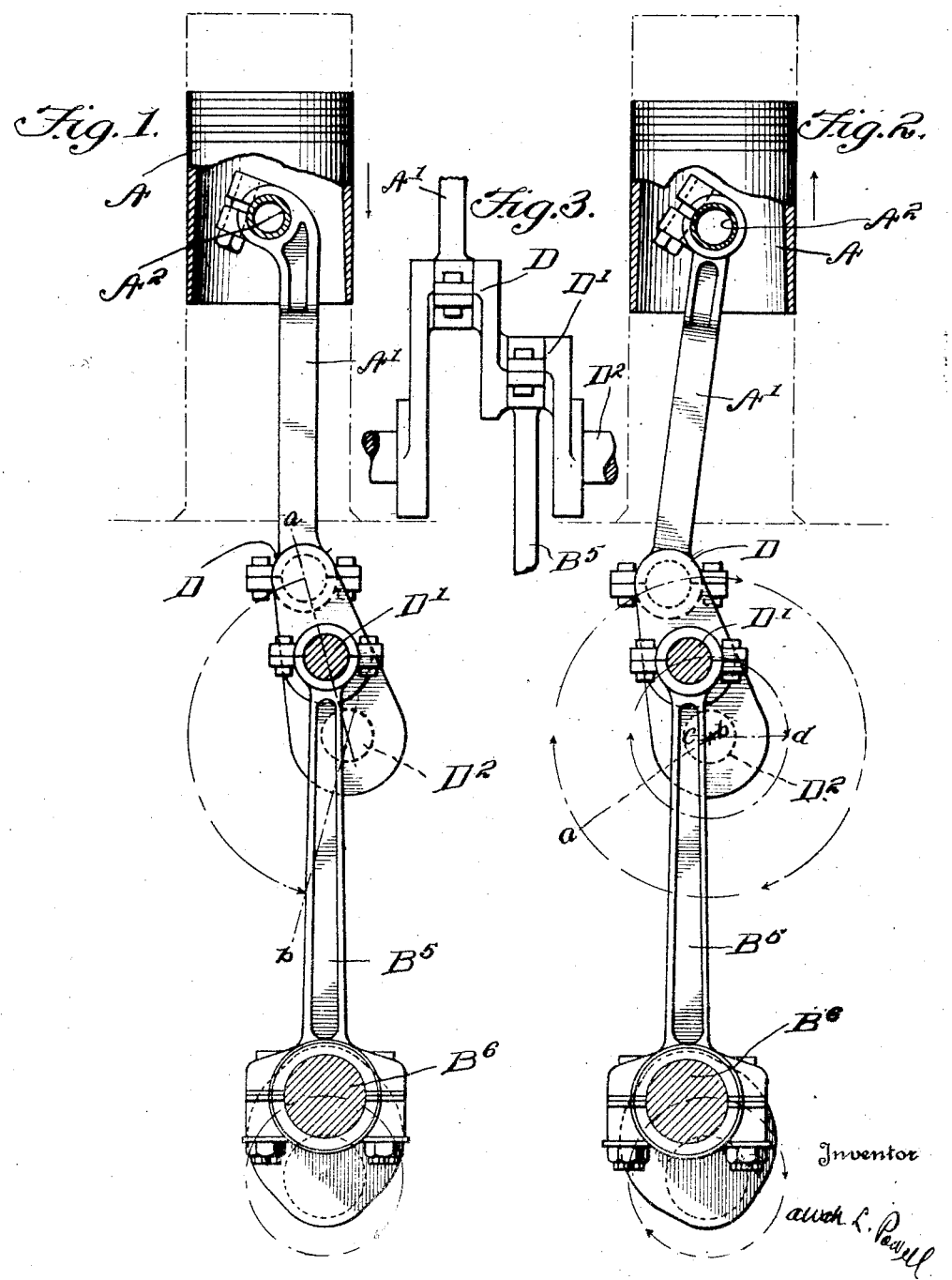

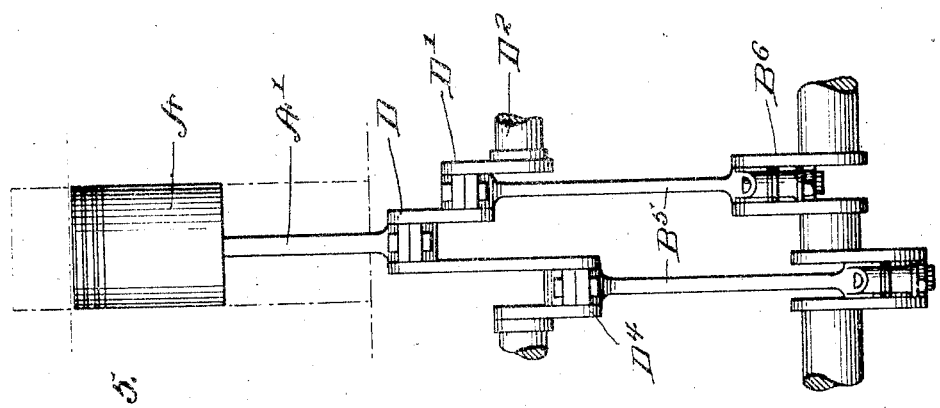
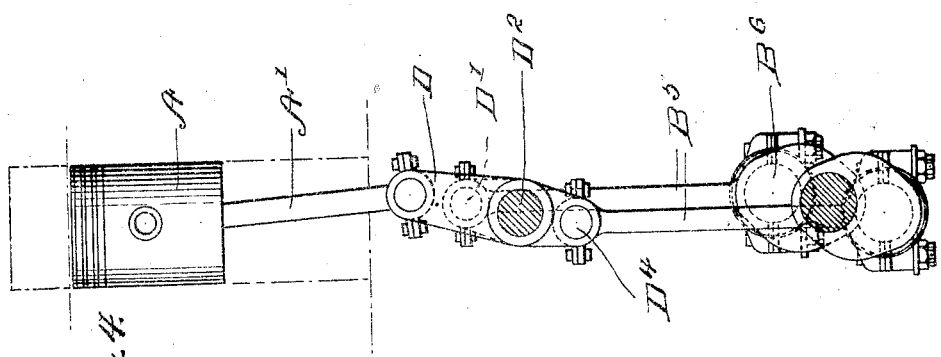

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,343.

Specification of Letters Patent. Patented July 12, 1921.

Application filed December 8, 1920. Serial No. 429,177.

*To all whom it may concern:*

Be it known that I, ALVAH L. POWELL, a citizen of the United States, residing at Miles City, in the county of Custer and State of Montana, have invented certain new and useful Improvements in Transmission for Engines, of which the following is a specification.

My invention relates to improvements in the transmitting member of engines, by which I secure a variation in the movement of the piston with reference to that of the crank, enabling me to gain advantages in the operation of such engines that are not possible with the constructions at present used. This application is for improvements shown over others contained in a series filed with it, bearing Serial Numbers 429,168, 429,170 to 429,176, inclusive, but while the general principles are the same the construction herein described has uses and advantages of its own.

In this application I show a modification of my transmitting members, using cranks, suitably disposed, to replace the racks and pinions heretofore shown, but retaining the differential relation between the stroke of the engine and that of the piston. In the accompanying drawings—

Figure 1 is an elevation of my improvement, partly in section.

Fig. 2 is a similar view of a modification of the arrangement shown in Fig. 1.

Fig. 3 is a detail of the intermediate lever cranks.

Figs. 4 and 5 show a further modification of the original construction, the views being elevations from opposite points.

In Fig. 1 is shown a piston of any engine, but preferably of one of the internal combustion type, connected by a link, $A^1$, the equivalent here of the piston rod of an ordinary prime mover, to a crank at D, Figs. 1, 2 and 3. The crank D is centered on a shaft, $D^2$, that is supported at any convenient point, or by the engine frame. It will be noted in the views, Figs. 1 and 3, that D is one of two cranks, the shorter of which, $D^1$, is formed on the same crank member, the pair being integral, but differing in throw. To the crank $D^1$ is attached a connecting rod, $B^5$, that is fitted to a crank $B^6$ on an engine shaft. It is evident from this relation that on the outstroke of the piston A, the cranks D and $D^1$, Fig. 1, will move in the direction of arrow. The stroke of D being greater than that of $D^1$, the distance traveled by D will exceed that covered by $D^1$. On the return stroke of the piston the two cranks will move back to the point shown in Fig. 1, working between the loci $a$—$b$. Assuming a piston stroke of six inches, the stroke of the secondary crank $D^1$ will travel approximately four inches, according to the scale of the drawing. The power developed in the long stroke of piston A will, therefore, be concentrated in the short stroke of the crank $D^1$. It will be noted, however, that in Fig. 1 the center line of the piston does not coincide with the center line of the crank shaft. By this means the angularity of the piston rod, or link $A^1$, is lessened in this form of construction.

The reciprocating action of the cranks D, $D^1$, is governed by the radius of the travel of these cranks, and the length of the piston stroke. In Fig. 2 I show an arrangement by which both the cranks, D, $D^1$, and the engine crank, all rotate in unison. This effect is secured by altering the radius of the crank circle $a$—$b$—$c$—$d$, the radius being less than that of the radius arc $a$—$b$, in Fig. 1. The piston stroke and crank stroke in both views, that is, in Figs. 1 and 2, are similarly proportioned, the difference of length between piston and crank strokes being maintained.

In Figs. 4 and 5 I show an arrangement of cranks by which I secure a balancing effect with reference to vibration. In this construction the intermediate crank D remains the same, but the secondary is multiplied, that is, $D^1$ is balanced by another of equal throw, $D^4$, the two being set at one hundred and eighty degrees of the crank circle. The thrust of the piston is thus made to exert a double action on the engine crank shaft, the push of the crank D being balanced by the pull of the crank $D^4$.

By the construction and arrangement shown I obtain a simple means of governing the relation of engine crank throw to piston stroke, and the extra length of piston travel may be utilized in modifying the ordinary functions of a piston in an internal combustion engine. A partial vacuum toward end of stroke may be made to serve as a cooling means; from the expansion derivable from a long stroke greater thermal efficiency may be attained; or, the full power of the long stroke may be concentrated in a crank stroke relatively short. By a proper arrangement of valves the piston may be made to draw in a charge for a fraction of the length of stroke, continuing and creating a partial vacuum that will effect a cooling action on engine walls and piston from the expansion of gases under such conditions, the lost work being returned on back stroke by the added effect of atmospheric or crank case pressure on the exposed portion of the piston. The speed of such an engine can be governed by the valve arrangement. At maximum intake and compression its speed will be greater. At shorter intake and expansion of charge through a greater length of stroke the speed will be lessened. Such an engine will have greater inherent capacity for flexibility with reference to maximum and minimum loads than one of the ordinary type.

Various modifications of the arrangement shown in this application may be made without departing from my invention.

What I claim is new and ask to have protected by Letters Patent, is—

In a differential transmission member, the combination of cranks of different pitch, supporting means for said cranks, a piston, a link from the crank of greater throw to said piston, a crank shaft, and a connecting rod from the crank of lesser throw to said crank shaft, for the purpose hereinbefore described.

In testimony whereof I affix my signature.

ALVAH L. POWELL.